US012358591B1

(12) United States Patent
Huang et al.

(10) Patent No.: US 12,358,591 B1
(45) Date of Patent: Jul. 15, 2025

(54) TRANSMISSION STRUCTURE OF MID-DRIVE MOTOR

(71) Applicant: Da Shiang Technology Co., Ltd., Taoyuan (TW)

(72) Inventors: Hao Lun Huang, Taoyuan (TW); Chun Cheng Wang, Taoyuan (TW); Hsiao Yu Wang, Taoyuan (TW)

(73) Assignee: DA SHIANG TECHNOLOGY CO., LTD., Taoyuan (TW)

( * ) Notice: Subject to any disclaimer, the term of this patent is extended or adjusted under 35 U.S.C. 154(b) by 0 days.

(21) Appl. No.: 18/736,573

(22) Filed: Jun. 7, 2024

(30) Foreign Application Priority Data

Mar. 21, 2024 (TW) .................................. 113110575

(51) Int. Cl.
*F16D 27/01* (2006.01)
*B62M 6/55* (2010.01)
*B62M 11/02* (2006.01)
*F16H 63/30* (2006.01)

(52) U.S. Cl.
CPC .............. *B62M 6/55* (2013.01); *B62M 11/02* (2013.01); *F16D 27/01* (2013.01); *F16H 2063/3046* (2013.01)

(58) Field of Classification Search
CPC ......... B62M 11/02; B62M 6/55; F16D 27/01; F16H 63/304; F16H 2063/3046
See application file for complete search history.

(56) References Cited

U.S. PATENT DOCUMENTS

| 11,993,343 | B1* | 5/2024 | Huang | ............... F16D 41/36 |
| 2020/0011385 | A1* | 1/2020 | Fidelfatti | ............. B60B 27/023 |
| 2021/0155038 | A1* | 5/2021 | Miles | ............... B60B 27/023 |
| 2022/0340231 | A1 | 10/2022 | Braedt et al. | |
| 2023/0122994 | A1 | 4/2023 | Hsu | |
| 2023/0234535 | A1* | 7/2023 | Yulish | ............... B62H 5/12 |
| | | | | 192/41 R |

FOREIGN PATENT DOCUMENTS

| CN | 107161245 A | 9/2017 |
| CN | 112407135 A | 2/2021 |
| CN | 115566853 A | 1/2023 |
| JP | H08282573 A | 10/1996 |

* cited by examiner

*Primary Examiner* — Minnah L Seoh
*Assistant Examiner* — Gregory T Prather
(74) *Attorney, Agent, or Firm* — WPAT, PC

(57) ABSTRACT

A transmission structure of a mid-drive motor has a shell, an output axle, a motor unit, and a clutch assembly. The clutch assembly has a driving ring, a clutch gear, an output gear, and a pressing device. The driving ring is connected to the motor unit. The output gear is connected to the output axle and is detachably connected to the clutch gear. The pressing device has a base casing, a pressing disc, and an elastic unit. The pressing disc moves axially in the base casing, and the elastic unit abuts the pressing disc and the base casing. The clutch gear drives the pressing disc to rotate, and the pressing disc pushes the clutch gear to engage with the output gear. The elastic unit and the pressing device reset the pressing disc, and the pressing device resets the clutch gear after the clutch gear separating from the output gear.

18 Claims, 12 Drawing Sheets

TRANSMISSION STRUCTURE OF MID-DRIVE MOTOR

BACKGROUND

1. Field of the Invention

The present invention relates to a transmission structure of a mid-drive motor, especially to a transmission structure of mid-drive motor that is capable of connecting and disconnecting the motor unit and the driven parts.

2. Description of the Prior Arts

Due to the rise of popularity of leisure life and environmental awareness, the number of bicycle riders is rising, and the terrains for riding a bicycle also become more and more extensive. However, the user may encounter a difficult situation when riding a bicycle in a steep area or for a long distance, or just simply the user lacks physical strength. Hence, in order to save stamina, in addition to the ordinary bicycles that completely rely on human power, electric bicycles are also developed.

An electric bicycle generally assists the user riding in a manner of an electric device which is installed on the bicycle exporting power. Among the electric devices, a mid-drive motor (or mid-drive unit) is provided, and the mid-drive motor is mounted on the bottom bracket instead of front or rear wheel, thus getting the name. The mid-drive motor exports power to the bottom bracket and pedals, and thereby the user saves stamina when pedaling.

Because of legal restriction, there is an upper limit of speed provided by the mid-drive motor; once the speed of the electric bicycle reaches the upper limit, the motor has to be switched off to stop supplying power. If the driving structure and the driven structure of the transmission device in the mid-drive motor are still engaging with each other, the driven structure turns out to reversely drive the driving structure, thus consuming extra stamina of the user. Thus, a clutch device is required to separate the driving structure and the driven structure when the mid-drive motor is power-off, and wear of each of the components in the transmission device may also be reduced.

Mounted on the bottom bracket of the bicycle, the mid-drive motor has to endure oscillation resulting from user pedaling. Furthermore, a configuration of the mid-drive motor is usually compact since a multi-stage reduction gear set is usually installed together, such that the available space is small. Therefore, how a clutch device is introduced in a such small space of the mid-drive motor and works steadily under continuous oscillation from pedaling is an important issue to be addressed.

To overcome the shortcomings, the present invention provides a transmission structure of a mid-drive motor to mitigate or obviate the aforementioned problems.

SUMMARY

The main objective of the present invention is to provide a transmission structure of a mid-drive motor that is capable of connecting and disconnecting the motor unit and the driven parts.

The transmission structure has a shell, an output axle, a motor unit, and a clutch assembly. The shell has two opposite surfaces. The output axle is disposed through the two opposite surfaces of the shell, and the output axle has a transmission toothed portion protruding from an outer annular surface of the output axle. The motor unit is mounted in the shell. The clutch assembly is mounted in the shell, and the clutch assembly connects with the output axle and the motor unit. The clutch assembly includes a driving ring, a clutch gear, an output gear, and a pressing device. The driving ring is connected to the motor unit, thereby the driving ring driven to rotate by the motor unit. The driving ring has an outer annular toothed portion and an inner annular toothed portion. The outer annular toothed portion is formed on an outer annular surface of the driving ring, and the motor unit is connected to the outer annular toothed portion. The inner annular toothed portion is formed on an inner annular surface of the driving ring. The clutch gear is disposed in the driving ring and is movable along an axial direction of the driving ring, the clutch gear is magnetically attractable. The clutch gear has a clutch annular toothed portion, multiple first engaging portions, and a first abutting portion. The clutch annular toothed portion is formed on an outer annular surface of the clutch gear, and the clutch annular toothed portion engages with the inner annular toothed portion of the driving ring. The multiple first engaging portions are formed on an end surface of the clutch gear, the first engaging portions surrounds a center of rotation of the clutch gear, and the first engaging portions is connected to each other. The first abutting portion is formed on another end surface of the clutch gear. The output gear is connected to the output axle, and the output gear is capable of driving the output axle to rotate, the output gear and the clutch gear are detachably connected to each other; the output gear has an output annular toothed portion and multiple second engaging portions. The output annular toothed portion is formed on an outer annular surface of the output gear, and engages with the transmission toothed portion of the output axle. The multiple second engaging portions are formed on an end surface of the output gear, said end surface of the output gear faces towards the clutch gear, the second engaging portions surrounds a center of rotation of the output gear, and the second engaging portions are connected to each other. The second engaging portions selectively engages with the first engaging portions. The pressing device is located at a side of the clutch gear away from the output gear, the pressing device is magnetic and has a base casing, a pressing disc, and an elastic unit. The base casing is annular to form a mounting space, and an opening is formed on the base casing; the opening spatially communicates with the mounting space, and the opening faces towards the clutch gear, the base casing has an inner bottom surface located in the mounting space and facing towards the opening; and a first sliding portion formed on the inner bottom surface. The pressing disc is located in the mounting space and is movable along an axial direction of the base casing. The pressing disc has a second abutting portion and a second sliding portion. The second abutting portion is formed on a surface of the pressing disc, and said surface of the pressing disc faces towards the opening, the second abutting portion and the first abutting portion detachably abut each other, thereby the clutch gear driving the pressing disc to rotate. The second sliding portion is formed on a surface of the pressing disc, and said surface of the pressing disc faces towards the inner bottom surface, and the second sliding portion is capable of sliding with respect to the first sliding portion. The elastic unit is located in the mounting space, and the elastic unit abuts the pressing disc and a part of the base casing surrounding the opening.

Thus, when the motor unit stops exporting power, the clutch gear separates from the output gear to prevent forming resistance to the user pedaling and wearing the clutch gear and the output gear; on the other hand, when the motor unit starts exporting power, the pressing disc would press the clutch gear to engage with the output gear to transmit power to the output axle. Other objectives, advantages and novel features of the invention will become more apparent from the following detailed description when taken in conjunction with the accompanying drawings.

DETAILED DESCRIPTION

Figure 1:
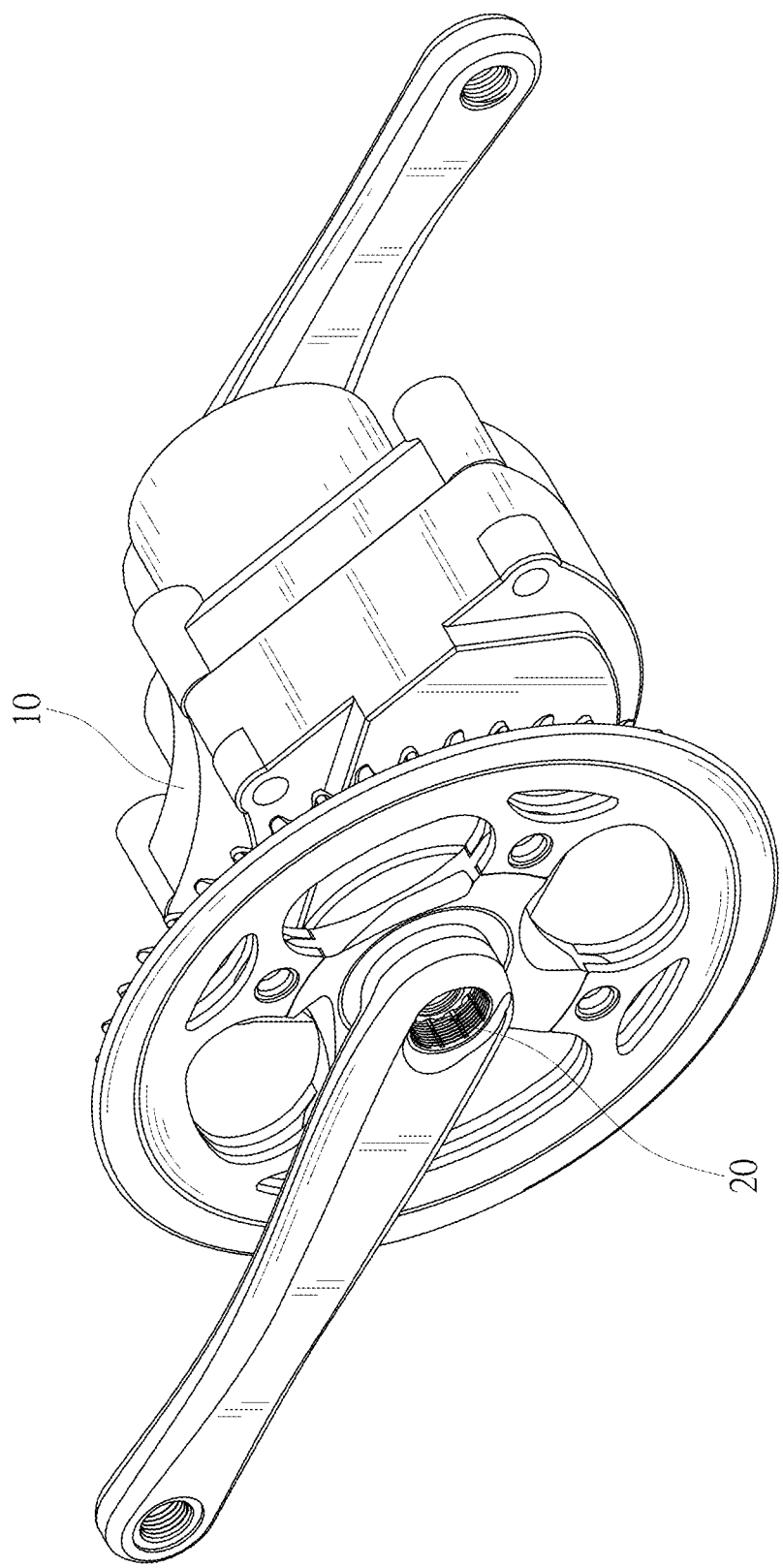
FIG. 1 is a perspective view of a transmission structure of a mid-drive motor in accordance with the present invention.
Figure 2:
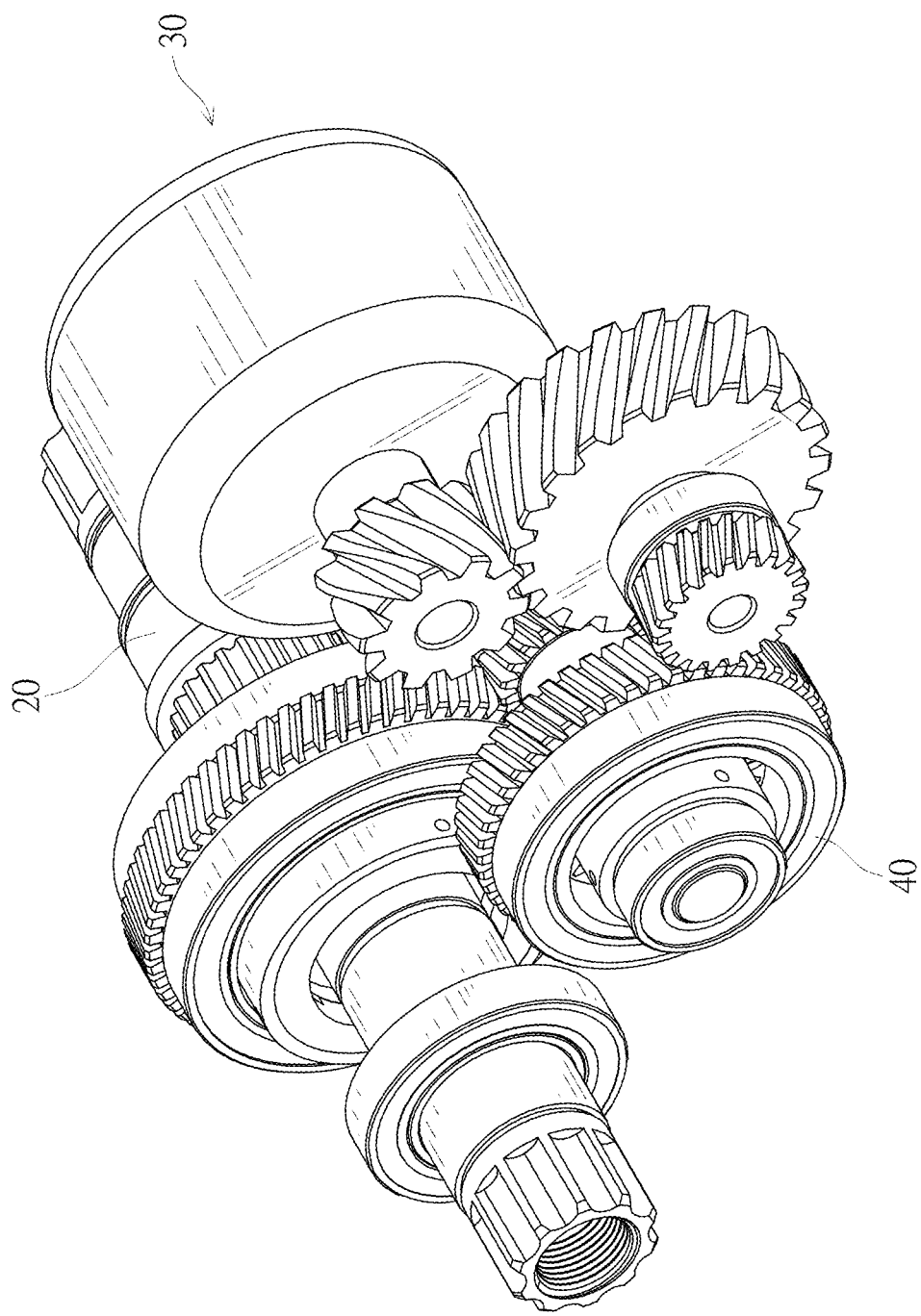
FIG. 2 is another perspective view of the transmission structure of a mid-drive motor in FIG. 1, shown without the shell.
Figure 3:
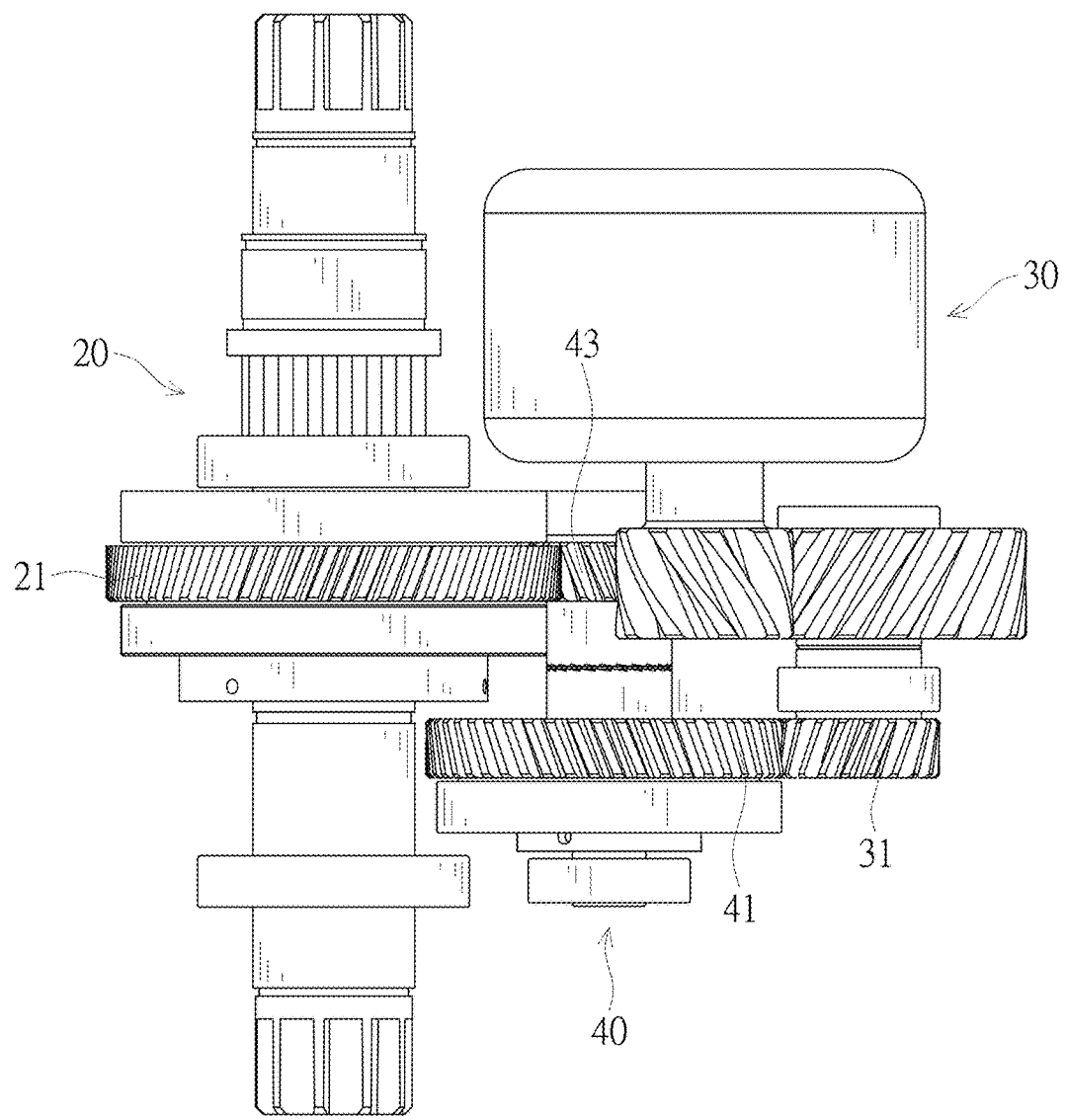
FIG. 3 is a top view of FIG. 2.
Figure 4:
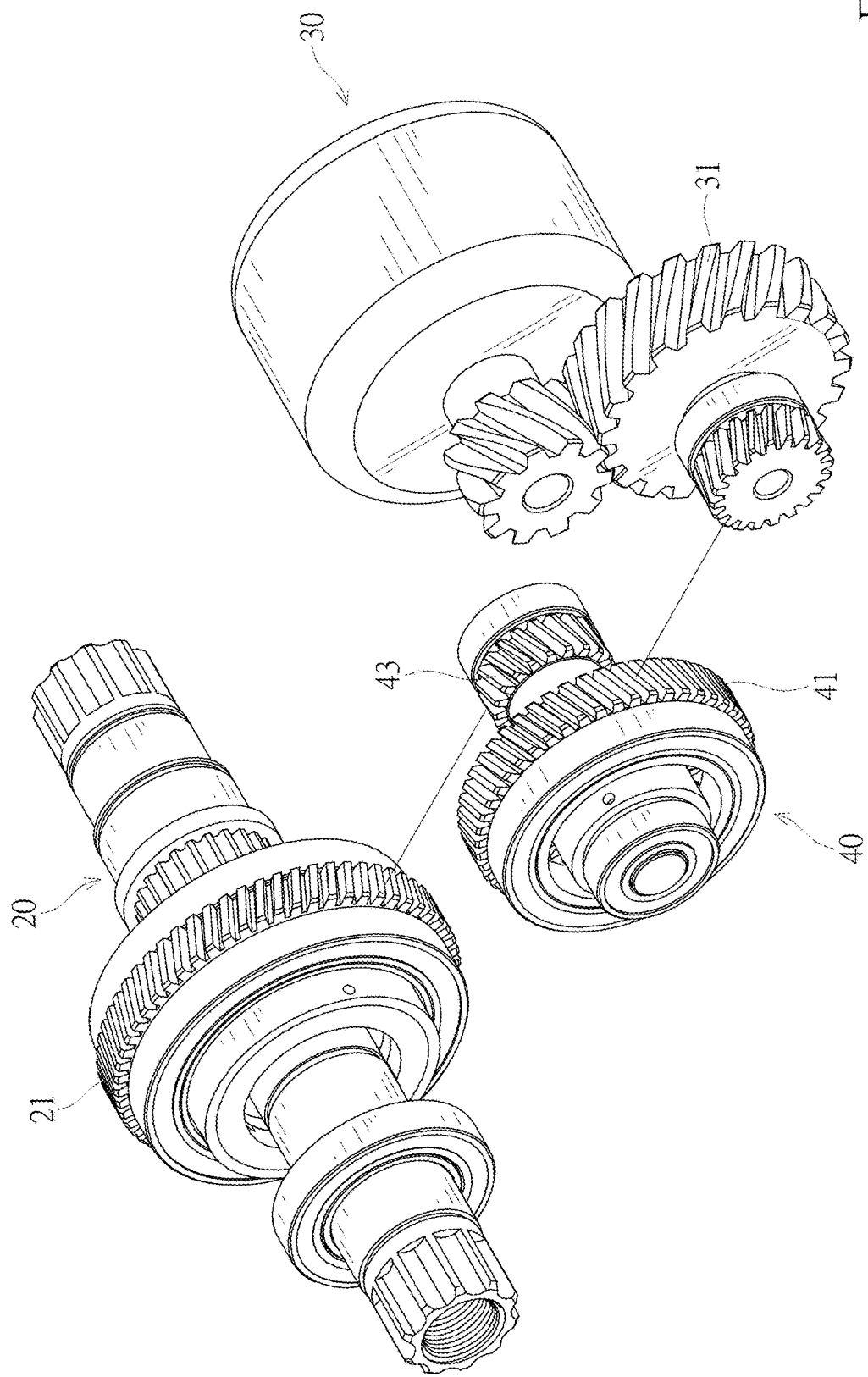
FIG. 4 is an exploded view of the transmission structure of a mid-drive motor in FIG. 1.

With reference to FIGS. 1 to 4, a transmission structure of a mid-drive motor in accordance with the present invention comprises a shell 10, an output axle 20, a motor unit 30, and a clutch assembly 40.

The shell 10 has two opposite surfaces, and the output axle 20 is mounted through the shell 10, and is disposed through the two opposite surfaces the shell 10. The output axle 20 has a transmission toothed portion 21. The transmission toothed portion 21 protrudes from an outer annular surface of the output axle 20, and the transmission toothed portion 21 is located in the shell 10. In this embodiment, the transmission toothed portion 21 is in configuration of helical teeth, but it is not limited thereto. The motor unit 30 is mounted in the shell 10. The clutch assembly 40 is mounted in the shell 10, and the clutch assembly 40 connects with the output axle 20 and the motor unit 30. In this embodiment, the motor unit 30 is connected to the clutch assembly 40 via a connection gear set 31, and the connection gear set 31 includes a plurality of helical gears, but it is not limited thereto.

With reference to FIGS. 4 to 7, the clutch assembly 40 includes a driving ring 41, a clutch gear 42, an output gear 43, a pressing device 44, a transmission axle 45, and a middle bearing 46.

As shown in FIGS. 4 to 8, the driving ring 41 is connected to the motor unit 30, thereby the motor unit 30 driving the driving ring 41 to rotate. The driving ring 41 has an outer annular toothed portion 411, an inner annular toothed portion 412, and an annular protrusion 413.

The outer annular toothed portion 411 is formed on an outer annular surface of the driving ring 41, and the connection gear set 31 of the motor unit 30 is connected to the outer annular toothed portion 411. The inner annular toothed portion 412 is formed on an inner annular surface of the driving ring 41. In this embodiment, the driving ring 41 has opposite two end surfaces, and the annular protrusion 413 protrudes from one of the end surfaces and surrounds a center of rotation of the driving ring 41, but it is not limited thereto; in another embodiment, the driving ring 41 may not have the annular protrusion 413.

With reference to FIGS. 6 to 8, 11, and 12, the clutch gear 42 is mounted in the driving ring 41, and is movable with respect to the driving ring 41 along an axial direction of the driving ring 41. In this embodiment, the clutch gear 42 may be magnetically attractable, but it is not limited thereto. The clutch gear 42 has a clutch annular toothed portion 421, multiple first engaging portions 422, a first connecting portion 423, and a first abutting portion 424.

The clutch annular toothed portion 421 is formed on an outer annular surface of the clutch gear 42 and engages with the inner annular toothed portion 412 of the driving ring 41, and thereby the driving ring 41 drives the clutch gear 42 to rotate. In this embodiment, the clutch annular toothed portion 421 is in configuration of helical teeth, but it is not limited thereto. The clutch gear 42 has two opposite end surfaces at an axial direction of the clutch gear 42, and the first engaging portions 422 are formed on one of the end surface of the clutch gear 42, said end surface of the clutch gear 42 faces towards the output gear 43. To be more precise, the clutch gear 42 forms the first connecting portion 423, and the first connecting portion 423 protrudes toward the output gear 43. The surface of the first connecting portion 423 which faces towards the output gear 43 is the end surface of the clutch gear 42 which faces towards the output gear 43, and the first engaging portions 422 are formed on the surface of the first connecting portion 423 which faces towards the output gear 43.

The first engaging portions 422 surround a center of rotation of the clutch gear 42, and the first engaging portions 422 are connected to each other. In this embodiment, with reference to FIG. 12, each one of the first engaging portions 422 is a ratchet and has a first tooth surface 4221 and a second tooth surface 4222. The first tooth surface 4221 and the second tooth surface 4222 are connected to each other. The first tooth surface 4221 and the second tooth surface 4222 extend along a direction toward the output gear 43 and are inclined along a tangent direction of a rotating direction of the clutch gear 42.

The first abutting portion 424 protrudes from another one of the end surfaces of the clutch gear 42, and said another end surface of the clutch gear 42 faces towards the pressing device 44. In this embodiment, the first abutting portion 424 includes multiple ribs extending along a radial direction of the clutch gear 42, the ribs are arranged along a circumferential direction of the clutch gear 42 and the ribs are spaced apart from each other, but it is not limited thereto, as a configuration of the first abutting portion 424 may be altered according to need.

Besides, in this embodiment, an extension portion 425 protrudes from a surface of the clutch gear 42, and said surface of the clutch gear 42 faces towards the pressing device 44. The extension portion 425 surrounds the center of rotation of the clutch gear 42, and the first abutting portion 424 is located at the extension portion 425, but it is not limited thereto; in another embodiment, the clutch gear 42 may not have the extension portion 425.

With reference to FIGS. 4 to 7 and 12, the output gear 43 is connected to the output axle 20 and is capable of driving the output axle 20 to rotate. The output gear 43 and the clutch gear 42 are detachably connected to each other, and thereby the clutch gear 42 selectively drives the output gear 43 to rotate. The output gear 43 has an output annular toothed portion 431, multiple second engaging portions 432, and a second connecting portion 433.

The output annular toothed portion 431 is formed on an outer annular surface of the output gear 43, and the output annular toothed portion 431 engages with the transmission toothed portion 21 of the output axle 20. In this embodiment, the output annular toothed portion 431 is in configuration of helical teeth, but it is not limited thereto. The output gear 43 has two opposite end surfaces at an axial direction of the output gear 43, and the second engaging portions 432 are formed on one of the end surfaces of the output gear 43, and said end surface of the output gear 43 faces towards the clutch gear 42. To be more precise, the output gear 43 forms the second connecting portion 433, and the second connecting portion 433 protrudes toward the clutch gear 42. The surface of the second connecting portion 433 which faces towards the clutch gear 42 is the end surface of the output gear 43 which faces towards the clutch gear 42, and the second engaging portions 432 are formed on the surface of the second connecting portion which faces towards the second connecting portion 433.

The second engaging portions 432 surround a center of rotation of the output gear 43, and the second engaging portion 432 are connected to each other. The second engaging portions 432 selectively engage with the first engaging portions 422. In this embodiment, each one of the second engaging portions 432 is a ratchet, and a shape of each one of the second engaging portions 432 corresponds to a shape of each one of the first engaging portions 422, but it is not limited thereto.

With reference to FIGS. 6 to 8 and 11, the pressing device 44 is located at a side of the clutch gear 42 away from the output gear 43. The pressing device 44 is magnetic and has a base casing 441, a pressing disc 442, an elastic unit 443, a first magnetic unit 444, and a second magnetic unit 445.

The base casing 441 is annular, forming a mounting space 4411, and the base casing 441 forms an opening 4412. The opening 4412 spatially communicates with the mounting space 4411, and the opening 4412 faces towards the clutch gear 42. The base casing 441 further has an inner bottom surface 4413 and a first sliding portion 4414. The inner bottom surface 4413 is located in the mounting space 4411 and faces towards the opening 4412, and the first sliding portion 4414 is formed on the inner bottom surface 4413. In this embodiment, the inner bottom surface 4413 forms multiple first sliding portions 4414, the first sliding portions 4414 are arranged spaced apart from each other along an circumferential direction of the inner bottom surface 4413; each one of the first sliding portions 4414 is a recess and is recessed from the inner bottom surface 4413, and each one of the first sliding portions 4414 has a recess bottom surface 4415, the recess bottom surface 4415 is inclined with respect to the inner bottom surface 4413. To be more precise, the recess bottom surface 4415 is inclined along a direction approaching the clutch gear 42 along a rotating direction of the clutch gear 42, but it is not limited thereto. In another embodiment, the first sliding portion 4414 may not be a recess.

The pressing disc 442 is located in the mounting space 4411 and is movable along an axial direction of the base casing 441. In this embodiment, the pressing disc 442 is shaped as a round disc and is magnetically attractable, but it is not limited thereto, as a configuration of the pressing disc 442 may be altered according to need. The pressing disc 442 has a second abutting portion and a second sliding portion 4422.

The second abutting portion 4421 is formed on a surface of the pressing disc 442, and said surface of the pressing disc 442 faces towards the opening 4412. The second abutting portion 4421 and the first abutting portion 424 detachably abut each other, and thereby the clutch gear 42 is capable of driving the pressing disc 442 to rotate. In this embodiment, the second abutting portion 4421 includes multiple ribs, each one of said ribs extends along a radial direction of the pressing disc 442 and protrudes from a surface of the pressing disc 442, and said surface of the pressing disc 442 faces towards the clutch gear 42. The ribs of the second abutting portion 4421 are arranged spaced apart from each other along a circumferential direction of the pressing disc 442. Since the ribs of the first abutting portion 424 protrude from the surface of the clutch gear 42 which faces towards the pressing disc 442, when the pressing disc 442 and the clutch gear 42 contact each other, the first abutting portion 424 is capable of pushing the second abutting portion 4421 along the rotating direction of the clutch gear 42, and thereby the clutch gear 42 drives the pressing disc 442 to rotate.

Besides, in this embodiment, the clutch gear 42 is mounted through the opening 4412 of the base casing 441 via the extension portion 425, and thus the clutch gear 42 detachably contacts the pressing disc 442, and the first abutting portion 424 pushes the second abutting portion 4421 accordingly.

The second sliding portion 4422 is formed on a surface of the pressing disc 442, and said surface of the pressing disc 442 faces towards the inner bottom surface 4413. The second sliding portion 4422 is capable of sliding with respect to the first sliding portion 4414. In this embodiment, the pressing disc 442 may have multiple second sliding portions 4422. A number of the second sliding portions 4422 corresponds to a number of the first sliding portions 4414, and locations of the second sliding portions 4422 correspond to locations of the first sliding portions 4414 respectively. Each one of the second sliding portions 4422 is a protrusion and located in the corresponding first sliding portion 4414 which is a recess. The second sliding portion 4422 contacts the recess bottom surface 4415 of the corresponding first sliding portion 4414, and the second sliding portion 4422 is capable of sliding along the recess bottom surface 4415.

The elastic unit 443 is located in the mounting space 4411, the elastic unit 443 abuts the pressing disc 442 and a part of the base casing 441 which surrounds the opening 4412, such that the elastic unit 443 tends to push the pressing disc 442 to move toward the inner bottom surface 4413.

In this embodiment, the pressing device 44 has the first magnetic unit 444 mounted on the base casing 441 and located around the opening 4412. The pressing device 44 may have multiple first magnetic units 444, and the first magnetic units 444 are disposed spaced apart from each other and arranged along a rim of the opening 4412. The first magnetic units 444 are configured to be the magnetic source of the pressing device 44, and thus attract the clutch gear 42 to move toward the pressing device 44. Similarly, the pressing device 44 may have multiple second magnetic units 445, and the second magnetic units 445 are spaced apart from each other and arranged on the inner bottom surface 4413 along a circumferential direction of the inner bottom surface 4413, thereby attracting the pressing disc 442 to move toward the inner bottom surface 4413, but it is not limited thereto.

Figure 5:
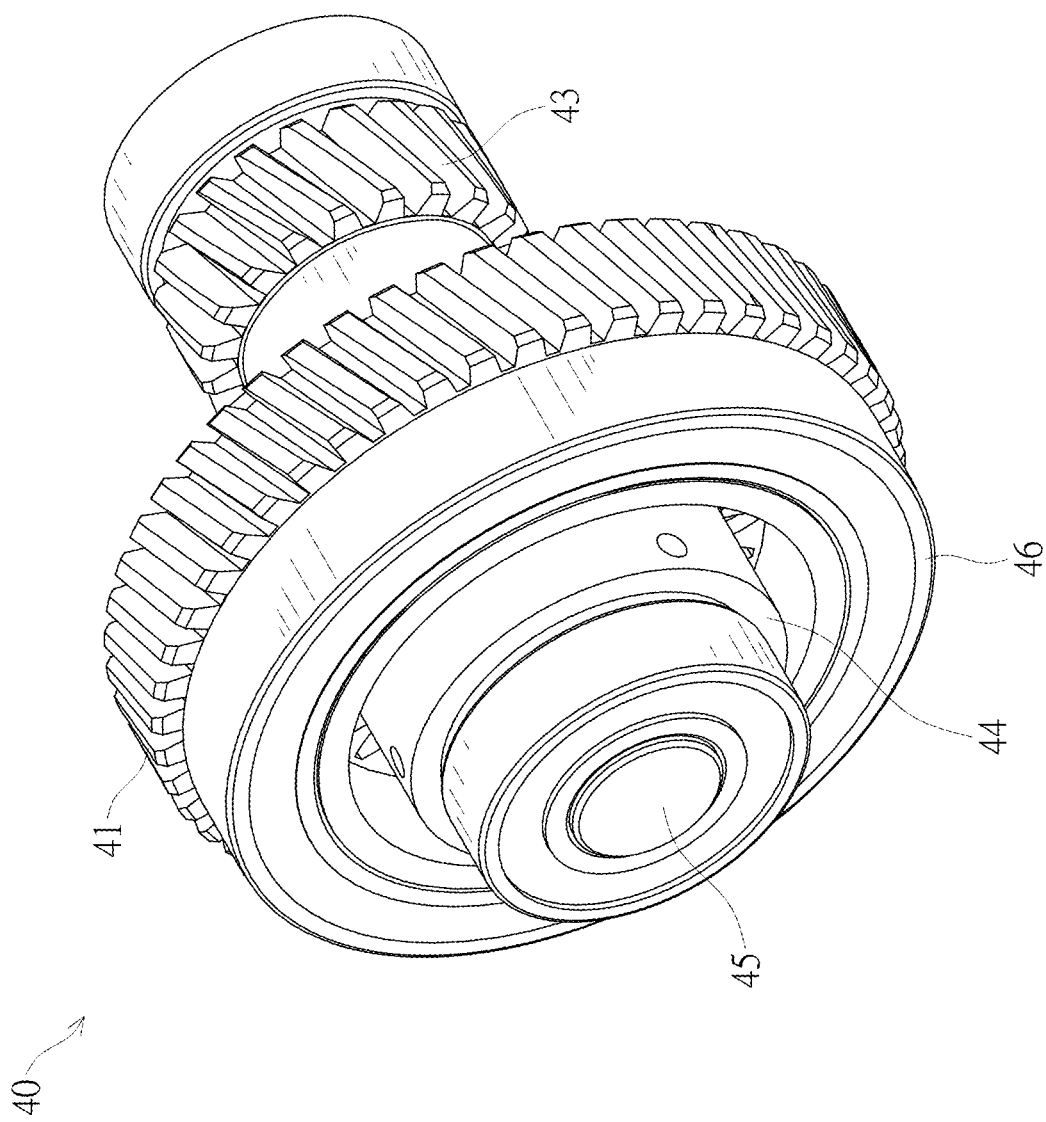
FIG. 5 is a perspective view of the clutch assembly of the transmission structure of a mid-drive motor in FIG. 1.
Figure 6:
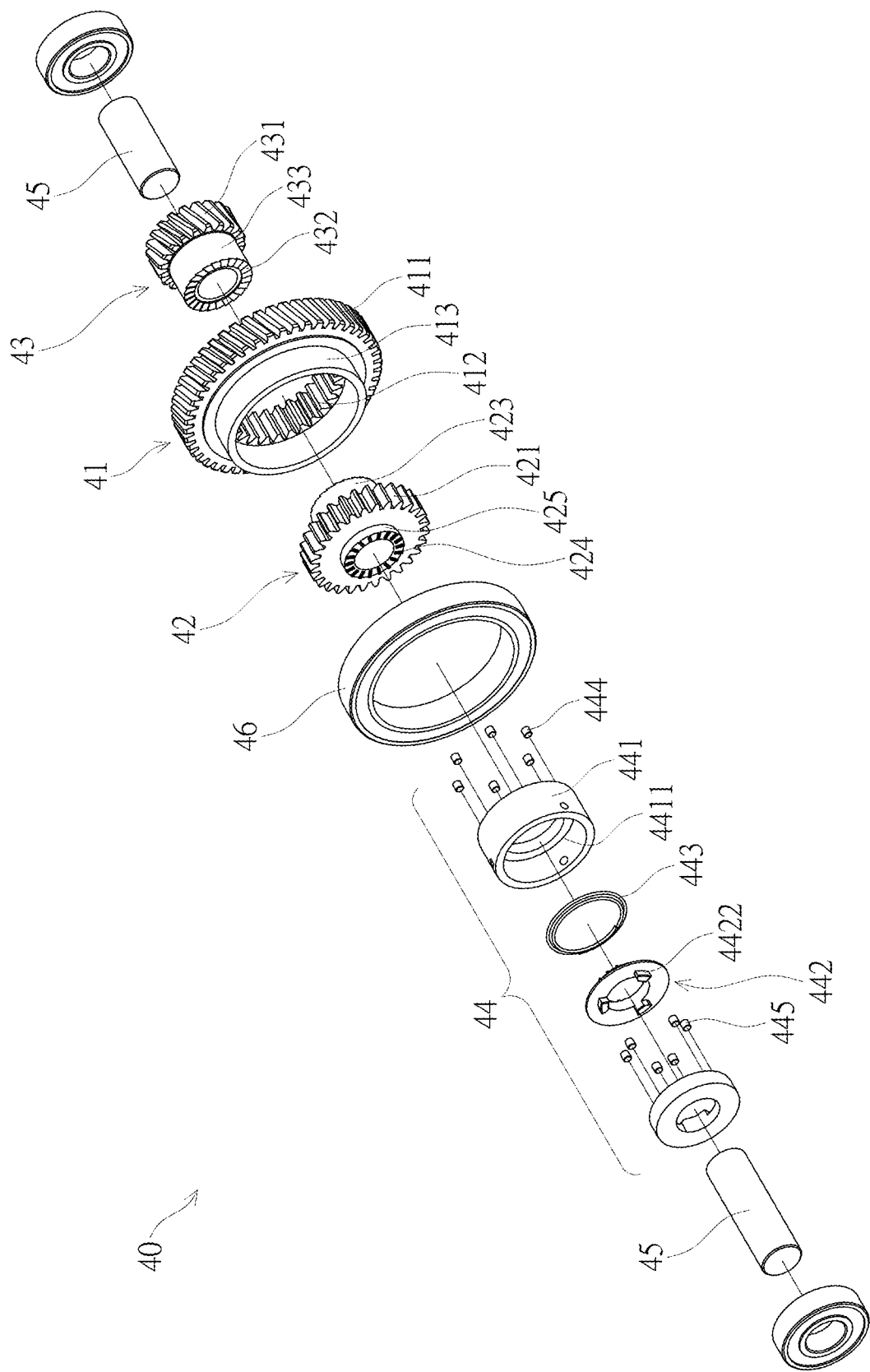
FIG. 6 is an exploded view of the clutch assembly in FIG. 5.
Figure 7:
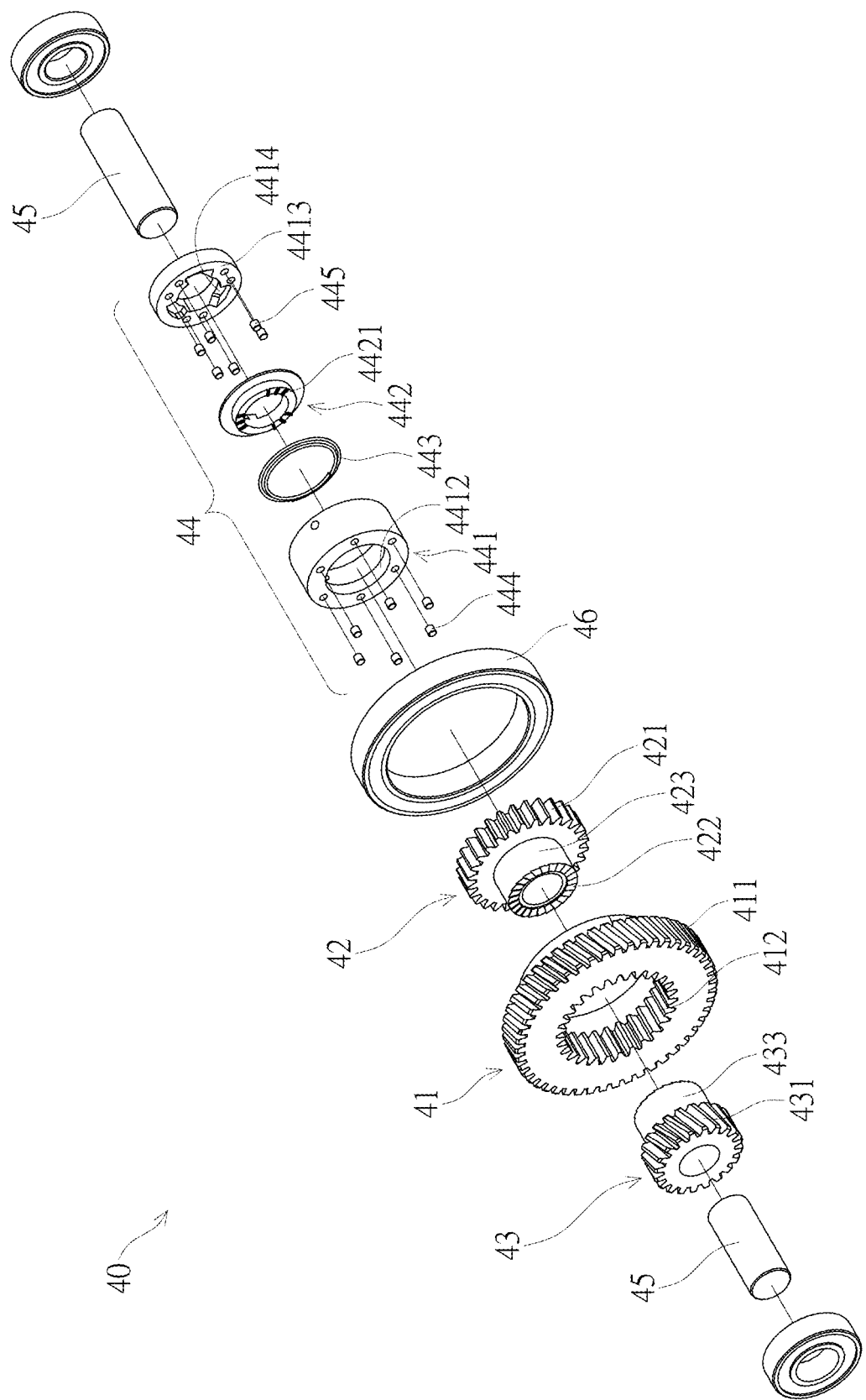
FIG. 7 is another exploded view of the clutch assembly in FIG. 5, shown in another view angle from FIG. 6.

With reference to FIGS. 5 to 7, the clutch assembly 40 further has the transmission axle 45. The transmission axle 45 is mounted through the clutch gear 42, the output gear 43, and the pressing device 44, such that each one of the clutch gear 42, the output gear 43, and the pressing device 44 is capable of rotating with respect to the transmission axle 45. To be more precise, the clutch gear 42, the output gear 43, and the pressing disc 442 which is in the pressing device 44 are arranged co-axially, and the transmission axle 45 is mounted through the centers of rotation of the clutch gear 42, the output gear 43, and the pressing disc 442, thereby stabilizing relative positions of the clutch gear 42, the output gear 43, and the pressing disc 442 to avoid shifting during operation, but it is not limited thereto, as the clutch assembly 40 may not have the transmission axle 45.

Besides, the clutch assembly 40 may further have a middle bearing 46, the middle bearing 46 is mounted on the driving ring 41; to be more precise, the middle bearing 46 is sleeved on the annular protrusion 413 of the driving ring 41, and thereby supports the driving ring 41 rotating and prevents the driving ring 41 shifting, but it is not limited thereto, as the clutch assembly 40 may not have the middle bearing 46.

Figure 8:
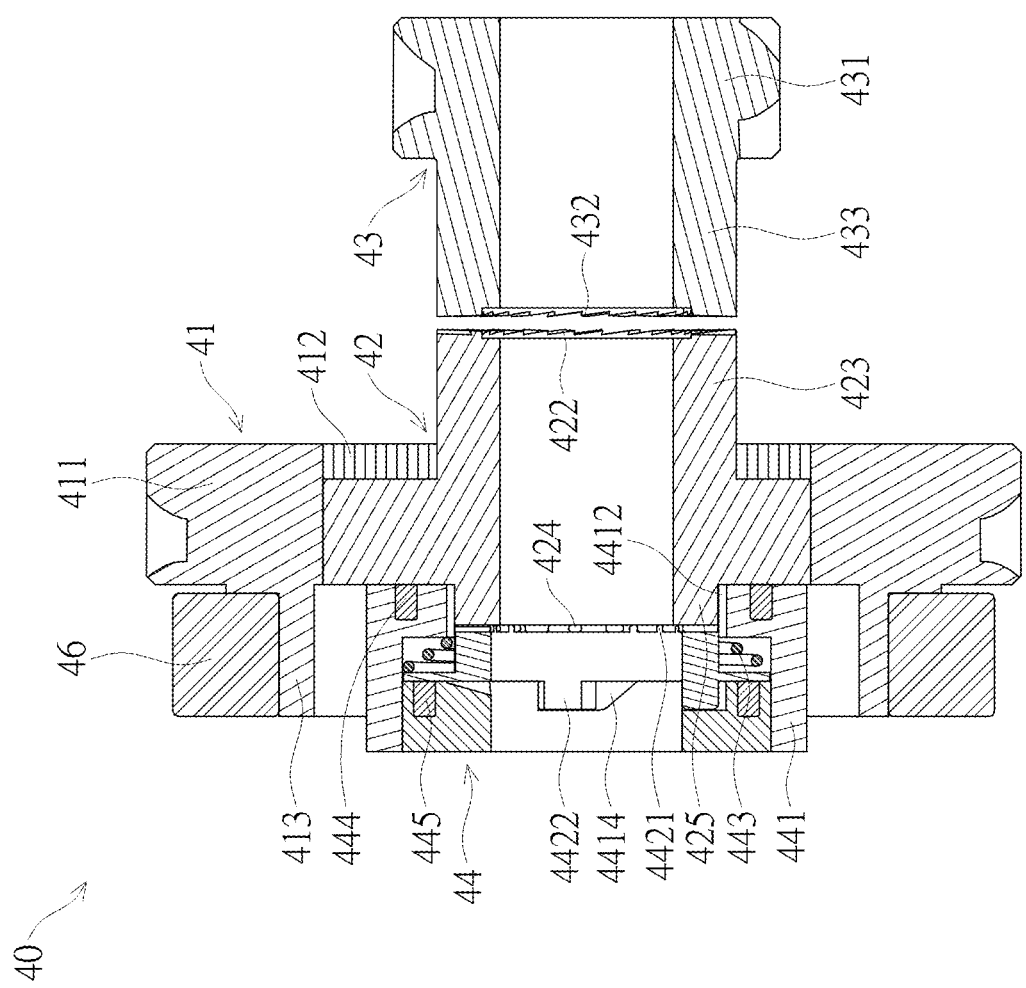
FIGS. 8 to 10 are cross-sectional side views of the clutch assembly in FIG. 5, showing serial motions.

With reference to FIGS. 8 to 12, when the motor unit 30 is power-off as shown in FIG. 8, the clutch gear 42 would be attracted by the first magnetic unit 444 and thus separates from the output gear 43, and then abuts the pressing disc 442. The pressing disc 442 is pushed by the elastic unit 443 and thus abuts the inner bottom surface 4413, and the second sliding portion 4422 is located in the first sliding portion 4414.

Figure 9:
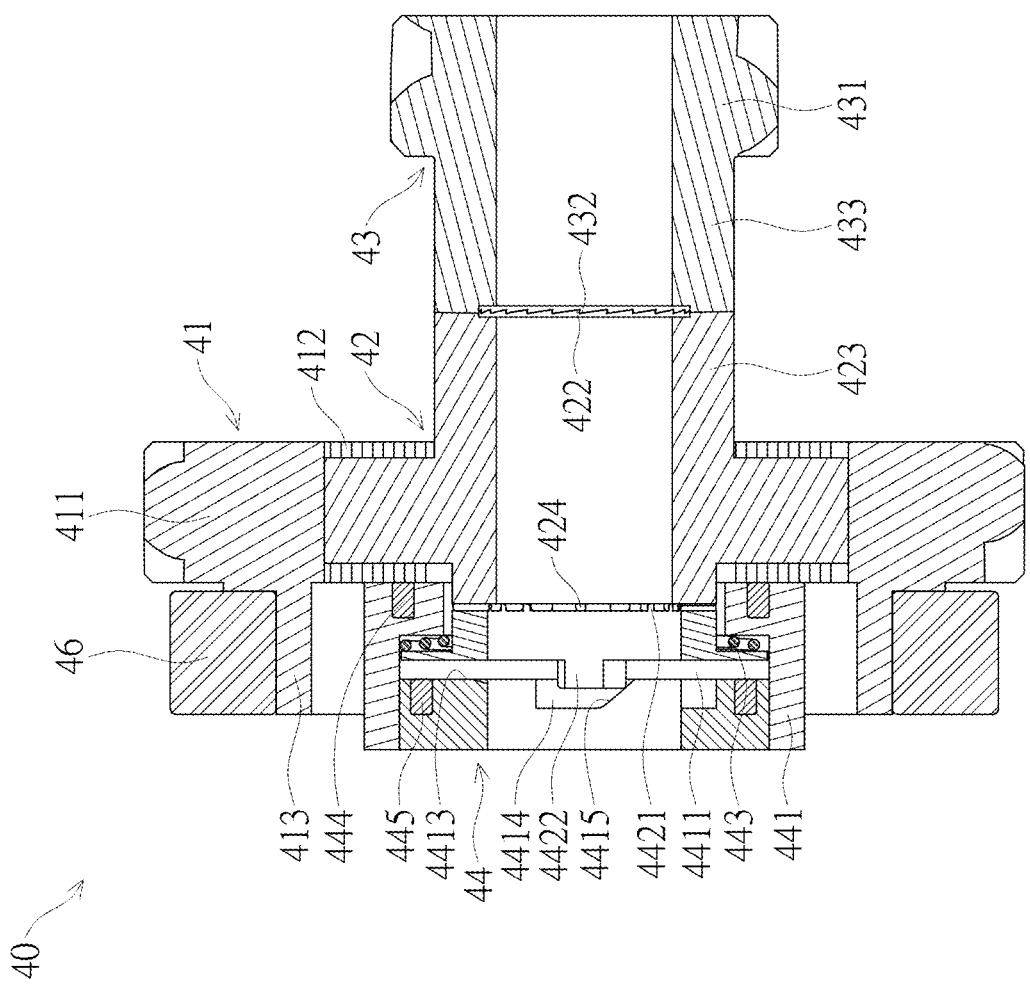
Figure 11:
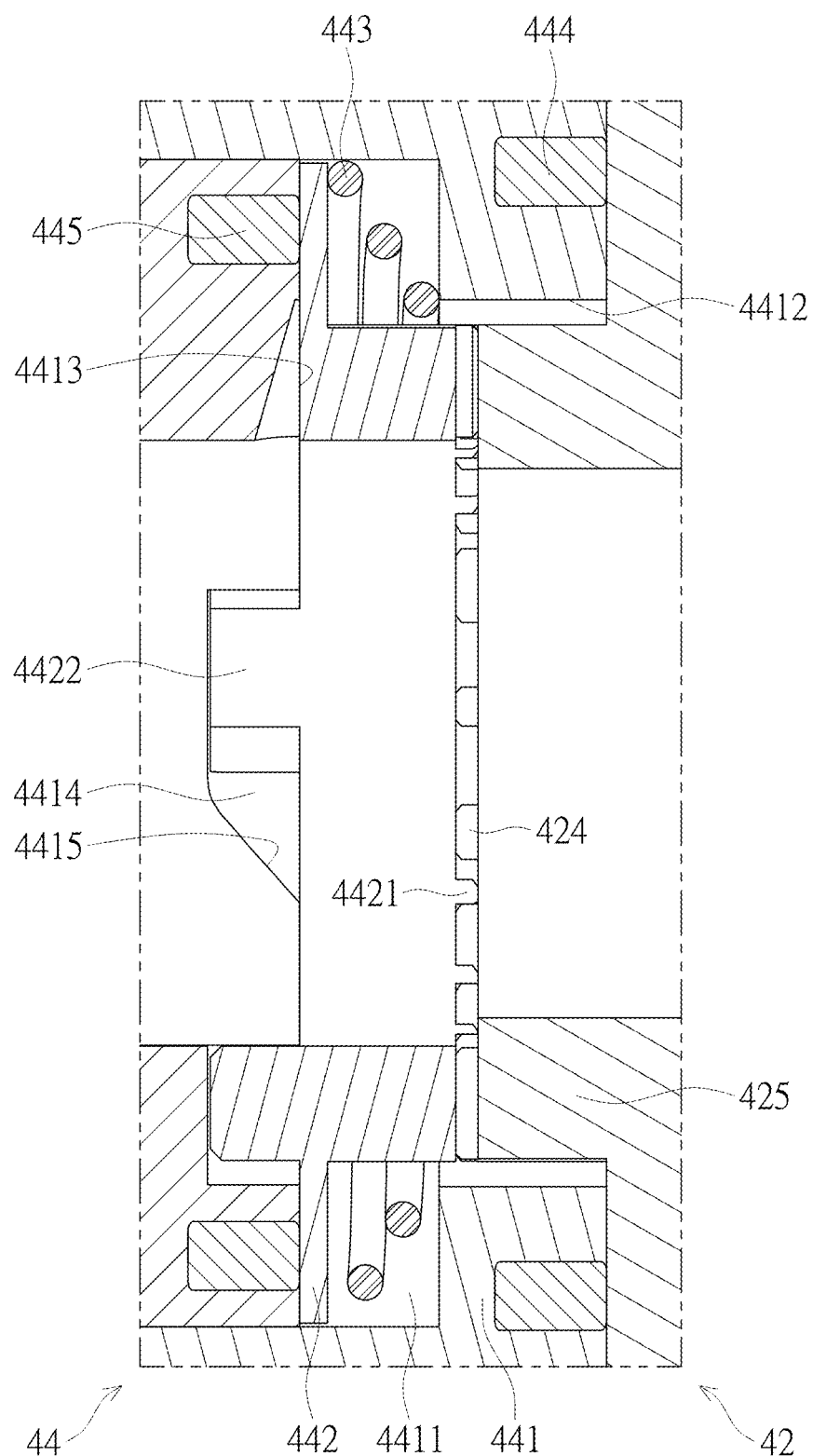
FIG. 11 is a partial-enlarged cross-sectional side view of the clutch assembly in FIG. 5, showing the first abutting portion and the second abutting portion abutting each other.
Figure 12:
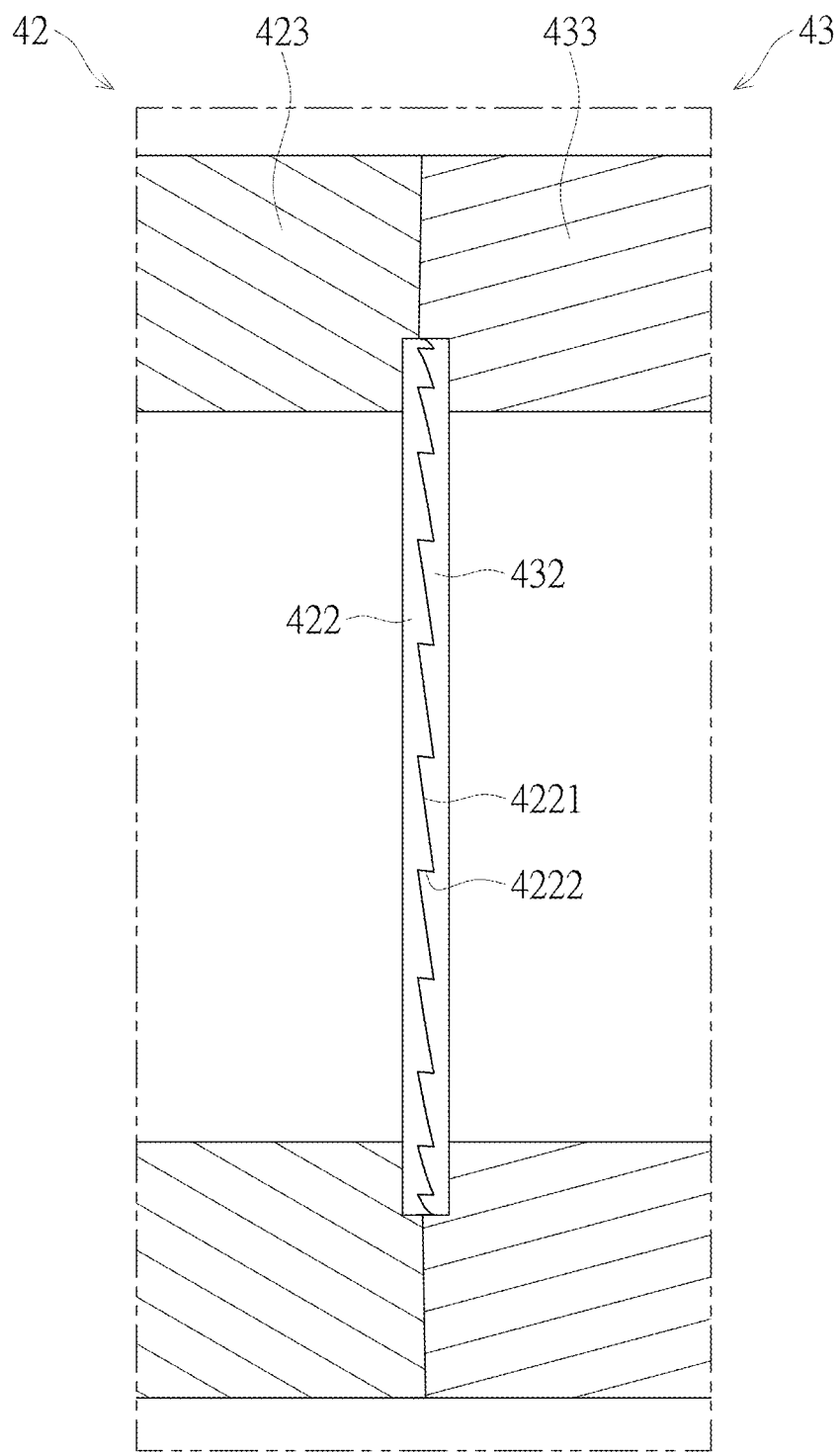
FIG. 12 is a partial-enlarged cross-sectional side view of the clutch assembly in FIG. 5, showing the first engaging portions engaging with the second engaging portions.

When the motor unit 30 is switched-on as shown in FIGS. 9 and 11, the motor unit 30 drives the driving ring 41 to rotate via the outer annular toothed portion 411. The driving ring 41 is mounted through the middle bearing 46 via the annular protrusion 413, thereby rotating with respect to the middle bearing 46 without shifting. Furthermore, the driving ring 41 drives the clutch gear 42 to rotate via the inner annular toothed portion 412, and the first abutting portion 424 of the clutch gear 42 pushes the second abutting portion 4421 of the pressing disc 442, and thus the pressing disc 442 starts rotating. As the pressing disc 442 is rotating, the second sliding portion 4422 slides along the recess bottom surface 4415 of the first sliding portion 4414, and thus the pressing disc 442 moves toward the opening 4412 of the base casing 441. The pressing disc 442 further pushes the clutch gear 42 to move toward the output gear 43 until the first engaging portions 422 contact and engage with the second engaging portions 432 as shown in FIG. 12, and thereby the clutch gear 42 drives the output gear 43 to rotate. The output gear 43 drives the output axle 20 to rotate via the output annular toothed portion 431 engaging with the transmission toothed portion 21, and transmits the power from the motor unit 30 to the output axle 20 to assist the user pedaling.

Figure 10:
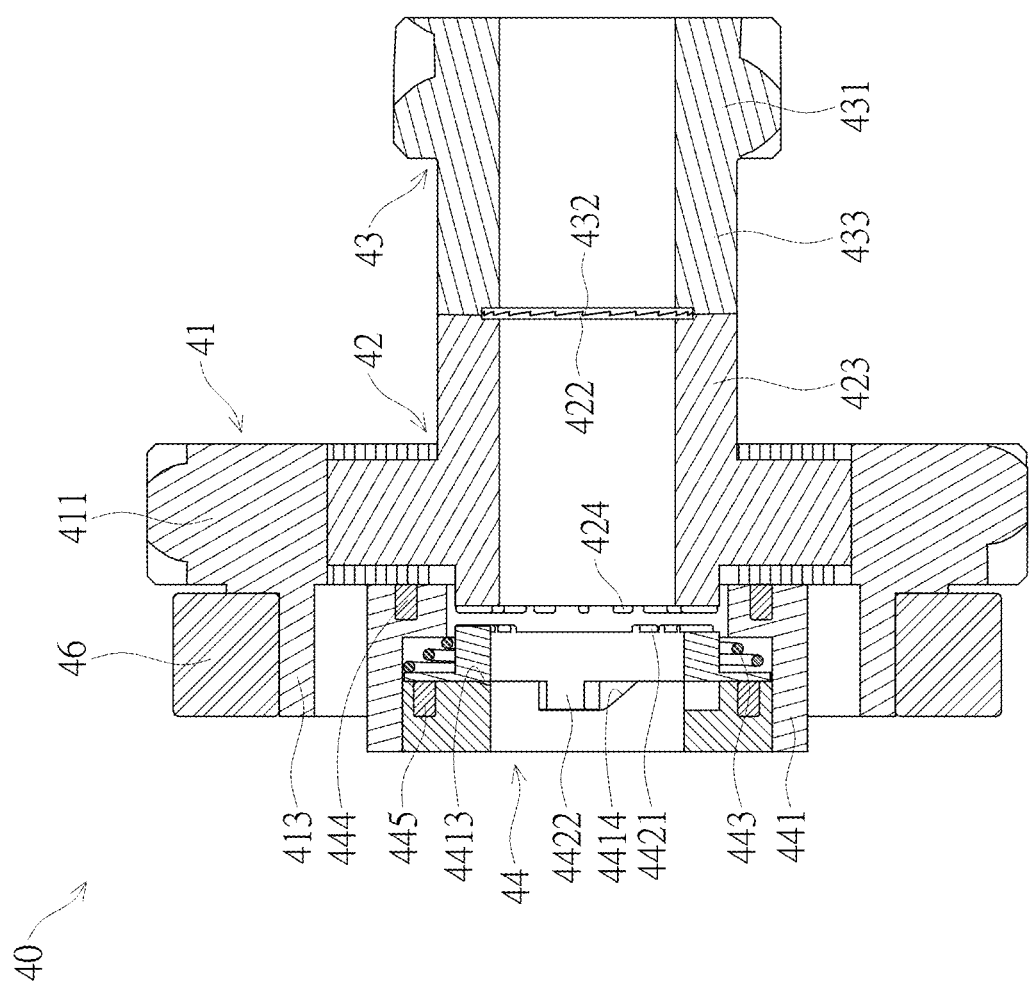

Since the first tooth surface 4221 and the second tooth surface 4222 of each one of the first engaging portions 422 are inclined along the tangent direction of the rotation direction of the clutch gear 42, when the first engaging portions 422 contact and engage with the second engaging portions 432, the clutch gear 42 would move closer to the output gear 43 accordingly, resulting in the separation of the clutch gear 42 and the pressing disc 442. And then as shown in FIG. 10, the elastic unit 443 and the second magnetic units 445 would reset the pressing disc 442 to the state before the motor unit 30 is switched on.

Once the motor unit 30 is powered-off or any other condition occurs that results in a rotating speed of the clutch gear 42 less than a rotating speed of the output gear 43, due to the first tooth surface 4221 and the second tooth surface 4222 of each one of the first engaging portions 422 inclined along the tangent direction of the rotating direction of the clutch gear 42, the first engaging portions 422 would be separated from the second engaging portions 432, and thus the first engaging portions 422 no longer engage with the second engaging portions 432. In addition, since the first tooth surface 4221 is inclined, when the clutch gear 42 and the output gear 43 start separating, a tip of each one of the second engaging portions 432 would slightly push the clutch gear 42 toward the pressing device 44 along the first tooth surface 4221, and thus the clutch gear 42 and the output gear 43 are separated completely. On the contrary, as long as the rotating speed of the output gear 43 is not higher than the rotating speed of the clutch gear 42 and the first engaging portions 422 are engaging with the second engaging portions 432, the clutch gear 42 would not separate from the output gear 43, and the power would be continuously transmitted from the motor unit 30 to the output gear 43 accordingly.

When the clutch gear 42 and the output gear 43 are separated from each other, the first magnetic units 444 on the pressing device 44 would attract the clutch gear 42 to move toward the pressing device 44, and thus the clutch gear 42 is reset to the state before the motor unit 30 is switched on as shown in FIG. 8.

The transmission structure of a mid-drive motor is capable of pushing the clutch gear 42 to engage with the output gear 43 via the pressing disc 442 of the pressing device 44 as long as the motor unit 30 starts exporting power, and then separating and resetting the pressing disc 442 quickly.

When the motor unit 30 stops exporting power, the clutch gear 42 can be completely separated from the output gear 43, without continuous contact which leads to wear of the first engaging portion 422 and the second engaging portion 432. Since the clutch gear 42 and the output gear 43 can be separated completely, the user does not need to reversely drive the motor unit 30 to rotate while pedaling, thus saving stamina, reducing wear of the components of the transmission structure of the mid-drive motor, and extending the service life of the mid-drive motor.

In addition, the transmission axle 45, the output gear 43, the clutch gear 42, and the pressing disc 442 are arranged accurately on an axis without shifting; furthermore, with the middle bearing 46, a possibility of shifting within the driving ring 41 and the clutch gear 42 during operation can be reduced, thus increasing the smoothness and the stability of clutch process. The clutch assembly 40 can work smoothly under a continuous oscillation state of the mid-drive motor resulting from the user pedaling, and an overall structure of the clutch assembly 40 is more compact.

The driving ring 41 and the clutch gear 42 together form a structure with a driving part outside and a driven part inside to fit the small space in the mid-drive motor. Similarly, the first connecting portion 423 of the clutch gear 42 and the second connecting portion 433 of the output gear 43 can structurally maintain the action strength of the clutch gear 42 and the output gear 43 and reduce the displacement required of the clutch gear 42, and thus the clutch gear 42 and the output gear 43 can connect with each other in the small space to further reduce a length of the driving ring 41 in the axial direction as well as an overall volume of the driving ring 41, thereby fitting the small space in the mid-drive motor.

In summary, the structure of the clutch assembly 40 is compact, thus being capable of being mounted in the limited space in the mid-drive motor and working smoothly without shifting resulting from the user pedaling. The clutch gear 42 and the output gear 43 can be completely separated, and thus the user does not need to waste stamina on reversely driving the motor unit 30, and then saves stamina and prevents wear of the clutch gear 42 and the output gear 43.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A transmission structure of a mid-drive motor, the transmission structure comprising:
    a shell having two opposite surfaces;
    an output axle disposed through the two opposite surfaces of the shell, and the output axle having:
        a transmission toothed portion protruding from an outer annular surface of the output axle;
    a motor unit mounted in the shell; and
    a clutch assembly mounted in the shell, and the clutch assembly connecting with the output axle and the motor unit, the clutch assembly including:
        a driving ring connected to the motor unit, thereby the driving ring driven to rotate by the motor unit; the driving ring having:
            an outer annular toothed portion formed on an outer annular surface of the driving ring, and the motor unit connected to the outer annular toothed portion; and
            an inner annular toothed portion formed on an inner annular surface of the driving ring;
        a clutch gear disposed in the driving ring and being movable along an axial direction of the driving ring, the clutch gear being magnetically attractable; the clutch gear having:
            a clutch annular toothed portion formed on an outer annular surface of the clutch gear, and the clutch annular toothed portion engaging with the inner annular toothed portion of the driving ring;
            multiple first engaging portions formed on an end surface of the clutch gear, the first engaging portions surrounding a center of rotation of the clutch gear, and the first engaging portions connected to each other; and
            a first abutting portion formed on another end surface of the clutch gear;
        an output gear connected to the output axle, and the output gear capable of driving the output axle to rotate, the output gear and the clutch gear detachably connected to each other; the output gear having:
            an output annular toothed portion formed on an outer annular surface of the output gear, and engaging with the transmission toothed portion of the output axle;
            multiple second engaging portions formed on an end surface of the output gear, said end surface of the output gear facing towards the clutch gear, the second engaging portions surrounding a center of rotation of the output gear, and the second engaging portions connected to each other; the second engaging portions selectively engaging with the first engaging portions; and
        a pressing device located at a side of the clutch gear away from the output gear, the pressing device being magnetic and having:
            a base casing being annular to form a mounting space, and an opening formed on the base casing; the opening spatially communicating with the mounting space, and the opening facing towards the clutch gear, the base casing having:
                an inner bottom surface located in the mounting space and facing towards the opening; and
                a first sliding portion formed on the inner bottom surface;
            a pressing disc located in the mounting space and being movable along an axial direction of the base casing; the pressing disc having:
                a second abutting portion formed on a surface of the pressing disc, and said surface of the pressing disc facing towards the opening, the second abutting portion and the first abutting portion detachably abutting each other, thereby the clutch gear driving the pressing disc to rotate; and
                a second sliding portion formed on a surface of the pressing disc, and said surface of the pressing disc facing towards the inner bottom surface, and the second sliding portion capable of sliding with respect to the first sliding portion; and
            an elastic unit located in the mounting space, and the elastic unit abutting the pressing disc and a part of the base casing surrounding the opening.

2. The transmission structure of a mid-drive motor as claimed in claim 1, wherein, the clutch assembly further includes:
    a transmission axle disposed through the clutch gear, the output gear, and the pressing device; each of the clutch gear, the output gear, and the pressing device being capable of rotating with respect to the transmission axle.

3. The transmission structure of a mid-drive motor as claimed in claim 2, wherein, the clutch assembly further includes:
    a middle bearing mounted on the driving ring; and
    the driving ring further having:
        an annular protrusion protruding from an end surface of the driving ring, and the annular protrusion surrounding a center of rotation of the driving ring, and the middle bearing mounted on the annular protrusion of the driving ring, thereby the driving ring rotating with respect to the middle bearing.

4. The transmission structure of a mid-drive motor as claimed in claim 3, wherein:
    the clutch gear forms a first connecting portion, and the first connecting portion protrudes toward the output gear, the first engaging portions are located on a surface of the first connecting portion, and said surface of the first connecting portion faces towards the output gear; and
    the output gear forms a second connecting portion, and the second connecting portion protrudes toward the clutch gear, the second engaging portions are located on a surface of the second connecting portion, and said surface of the second connecting portion faces towards the clutch gear.

5. The transmission structure of a mid-drive motor as claimed in claim 4, wherein:

the first sliding portion is a recess recessed from the inner bottom surface, and the first sliding portion has a recess bottom surface, the recess bottom surface is inclined with respect to the inner bottom surface; and the second sliding portion is a protrusion, and the second sliding portion is located in the first sliding portion, the second sliding portion contacts the recess bottom surface and is capable of sliding along the recess bottom surface.

6. The transmission structure of a mid-drive motor as claimed in claim 5, wherein each one of the first engaging portions and each one of the second engaging portions are ratchets, and a shape of each one of the second engaging portions corresponds to a shape of each one of the first engaging portions.

7. The transmission structure of a mid-drive motor as claimed in claim 6, wherein each one of the first engaging portions includes:

a first tooth surface and a second tooth surface, the first tooth surface and the second tooth surface connected to each other, and the first tooth surface and the second tooth surface extending along a direction toward the output gear and inclined along a tangent direction of a rotating direction of the clutch gear.

8. The transmission structure of a mid-drive motor as claimed in claim 7, wherein:

the first abutting portion protrudes from a surface of the clutch gear, and said surface of the clutch gear faces towards the pressing disc, the second abutting portion protrudes from the pressing disc, and said surface of the pressing disc faces towards the clutch gear, and thereby the first abutting portion is capable of pushing the second abutting portion along the rotating direction of the clutch gear.

9. The transmission structure of a mid-drive motor as claimed in claim 8, wherein the pressing device further includes:

a first magnetic unit mounted on the base casing, and located around the opening.

10. The transmission structure of a mid-drive motor as claimed in claim 9, wherein:

the pressing disc is magnetically attractable; and the pressing device further has a second magnetic unit mounted on the inner bottom surface for attracting the pressing disc.

11. The transmission structure of a mid-drive motor as claimed in claim 1, wherein, the clutch assembly further includes:

a middle bearing mounted on the driving ring; and the driving ring further having:

an annular protrusion protruding from an end surface of the driving ring, and the annular protrusion surrounding a center of rotation of the driving ring, and the middle bearing mounted on the annular protrusion of the driving ring, thereby the driving ring rotating with respect to the middle bearing.

12. The transmission structure of a mid-drive motor as claimed in claim 1, wherein:

the clutch gear forms a first connecting portion, and the first connecting portion protrudes toward the output gear, the first engaging portions are located on a surface of the first connecting portion, and said surface of the first connecting portion faces towards the output gear; and the output gear forms a second connecting portion, and the second connecting portion protrudes toward the clutch gear, the second engaging portions are located on a surface of the second connecting portion, and said surface of the second connecting portion faces towards the clutch gear.

13. The transmission structure of a mid-drive motor as claimed in claim 1, wherein:

the first sliding portion is a recess recessed from the inner bottom surface, and the first sliding portion has a recess bottom surface, the recess bottom surface is inclined with respect to the inner bottom surface; and the second sliding portion is a protrusion, and the second sliding portion is located in the first sliding portion, the second sliding portion contacts the recess bottom surface and is capable of sliding along the recess bottom surface.

14. The transmission structure of a mid-drive motor as claimed in claim 1, wherein each one of the first engaging portions and each one of the second engaging portions are ratchets, and a shape of each one of the second engaging portions corresponds to a shape of each one of the first engaging portions.

15. The transmission structure of a mid-drive motor as claimed in claim 14, wherein each one of the first engaging portions includes:

a first tooth surface and a second tooth surface, the first tooth surface and the second tooth surface connected to each other, and the first tooth surface and the second tooth surface extending along a direction toward the output gear and inclined along a tangent direction of a rotating direction of the clutch gear.

16. The transmission structure of a mid-drive motor as claimed in claim 1, wherein:

the first abutting portion protrudes from a surface of the clutch gear, and said surface of the clutch gear faces towards the pressing disc, the second abutting portion protrudes from the pressing disc, and said surface of the pressing disc faces towards the clutch gear, and thereby the first abutting portion is capable of pushing the second abutting portion along a rotating direction of the clutch gear.

17. The transmission structure of a mid-drive motor as claimed in claim 1, wherein the pressing device further includes:

a first magnetic unit mounted on the base casing, and located around the opening.

18. The transmission structure of a mid-drive motor as claimed in claim 1, wherein:

the pressing disc is magnetically attractable; and the pressing device further has a second magnetic unit mounted on the inner bottom surface for attracting the pressing disc.

\* \* \* \* \*